United States Patent
Balke et al.

(10) Patent No.: US 6,279,383 B1
(45) Date of Patent: Aug. 28, 2001

(54) METHOD AND APPARATUS FOR DETECTING LEAKAGE

(75) Inventors: David J. Balke, Morton Grove; Jacques E. Hoffmann, Lincolnwood, both of IL (US)

(73) Assignee: Intertech Corporation, Skokie, IL (US)

(*) Notice: Subject to any disclaimer, the term of this patent is extended or adjusted under 35 U.S.C. 154(b) by 0 days.

(21) Appl. No.: 09/236,950

(22) Filed: Jan. 25, 1999

(51) Int. Cl.[7] .................................................. G01M 3/04
(52) U.S. Cl. ...................................................... 73/40; 73/47
(58) Field of Search .................................. 73/40, 40.5 R, 73/45.4, 46, 47, 40.7

(56) References Cited

U.S. PATENT DOCUMENTS

| | | | |
|---|---|---|---|
| 1,289,699 | 12/1918 | Dixon | 73/47 |
| 1,701,876 | 2/1929 | Fleming | 73/47 |
| 5,440,918 | 8/1995 | Oster | 73/40.5 R |
| 5,526,679 | 6/1996 | Filippi et al. | 73/40.5 R |
| 5,537,857 | 7/1996 | Grosse Bley | 73/40.7 |
| 5,546,789 | 8/1996 | Balke et al. | 73/40 |
| 6,014,892 | 1/2000 | Baret et al. | 73/40.7 |
| 6,164,116 | 12/2000 | Rice et al. | 73/1.72 |

OTHER PUBLICATIONS

Nasca, Robert, *Testing Fluid Power Components*, pp. 268–274, Industrial Press Inc., 1990.
"Single Station Hydraulic Leak Development Test Stand for Dolphi EEMS #3086," InterTech, Development Co.

*Primary Examiner*—Daniel S. Larkin
*Assistant Examiner*—Jay L. Politzer
(74) *Attorney, Agent, or Firm*—Fitch, Even, Tabin & Flannery

(57) ABSTRACT

A method of, and apparatus for, determining leakage in a valve or the like which is not dependent on bulk modulus of the fluid is described. The test apparatus includes a pressure transducer which measures the change in pressure along a length of pipe (XY) from the valve under test to a second valve for a period of time. The effect of bulk modulus of the test fluid is eliminated by placing a volume of gas between the pressure transducer and the section XY of pipe. Leakage is determined by measuring the change in pressure at the transducer over a period of time after the valve under test is closed.

9 Claims, 14 Drawing Sheets

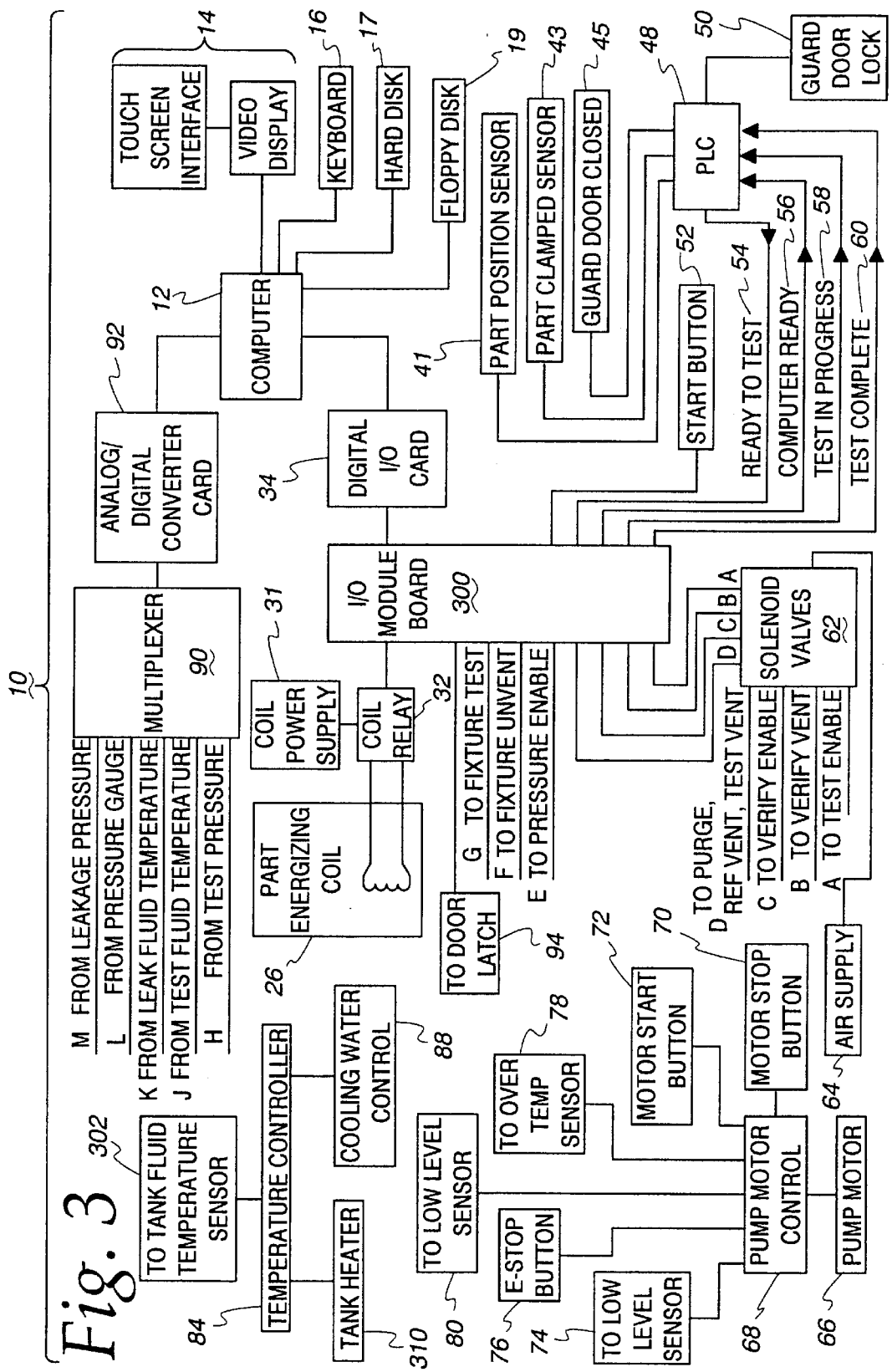

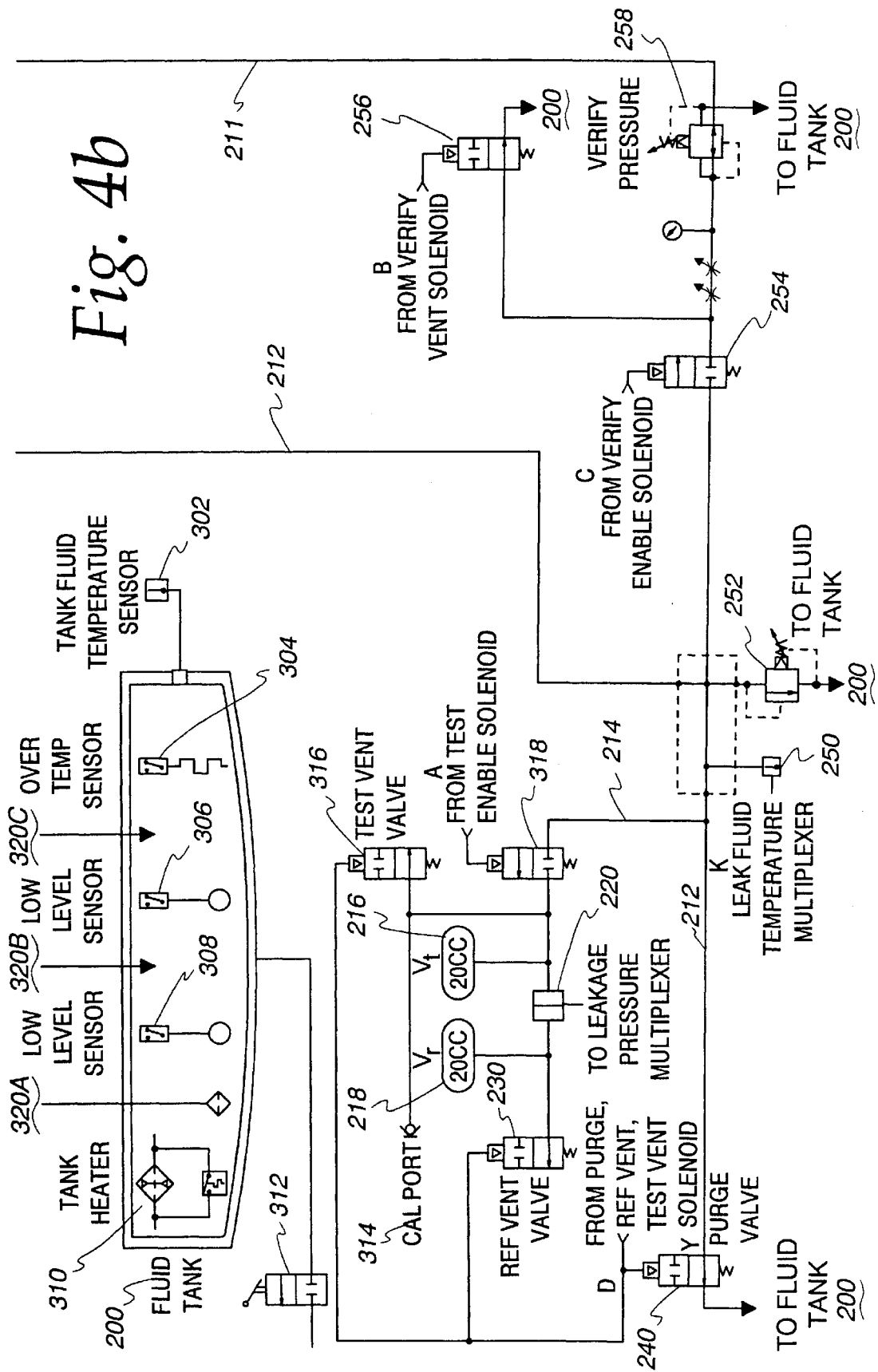

METHOD AND APPARATUS FOR DETECTING LEAKAGE

BACKGROUND OF THE INVENTION

The invention relates to leak detectors and, in particular, to liquid or fluid-based leak detectors for testing for leaks in hydraulic or liquid-carrying valves, and the like.

Leak detection equipment is used in a variety of industries to determine whether products are properly manufactured and assembled. Leak detection equipment is used to test individual products for presence of leaks which would degrade the performance of the product during its useful life. Not all leaks are, however, fatal to the performance of the product and a maximum acceptable leak rate is often established.

The object of leak testing is to measure the rate of leakage and to determine whether the measured rate is less than the maximum acceptable leakage rate. Any product leaking at a rate less than the maximum acceptable leakage rate meets the performance specifications relating to the product.

A leak is defined as the escape or entry of a gas or liquid into sealed enclosure. Leaks may result from material defects due to holes or porosity or process deficiencies such as sealing and joining problems. The majority of leaks are not simple circular holes in thin walls exhibiting predictable performance but more often are comprised of multiple variable leak paths that tend to be unique to a particular test part subjected to a specific set of conditions. Leaks of these types often have low leakage rates that are difficult to measure.

The detection of a leak from a test part under pressure is difficult to measure when the anticipated rate of leakage from the part is low or the available time for the measurement is relatively brief. High levels of pressurization can produce sufficient adiabatic heating effects which must be dissipated before any accurate measurement can be made. The magnitude of this problem is a direct function of the mass of the pressure gas; thus, the volume enclosed by the test part and the pressure of the test gas contained within the test part may effect the magnitude and severity of the adiabatic heating effects.

Bubble testing is the most prevalent method of leak testing in the industry. It comprises pressurizing the part to be tested, submerging the part in a water bath, and looking for a stream of bubbles. Although leaks as small as 0.05 standard cubic centimeters per minute (sccm) can be detected by this method, this method suffers from major disadvantages. It is relatively slow; it demands continuous operator attention and it usually requires drying the tested part before the tested part can continue in the manufacturing process. Determination of the amount of leakage is a difficult task.

Helium mass spectrometer leak detection is the most common method used to detect very small leaks as low as $10^{-11}$ standard cubic centimeters per second (sccs). The part under test is either pressurized internally or externally with helium or a mixture of helium and air. The helium being leaked is drawn into a very low vacuum and introduced into a mass spectrometer tuned for helium. The mass spectrometer output is proportional to the number of helium ions, which is a direct measure of the rate of leakage. Helium leak detection equipment is very expensive and can require long test times for particular parts.

Another method of leak detection is the pressure decay method. In the pressure decay method the part to be tested is pressurized to a pressure determined by a supply pressure. Once pressurized, the part under test is sealed to maintain the pressure therein. A pressure sensor is attached to the part which measures the internal pressure of the part of the test. If a leak is present, the pressure of the part will begin to decay at a rate determined by the size of the leak and the volume of the part. A test operator can determine the relative size of the leak by reading the pressure at the end of the test time and comparing it to a predetermined value.

Pressure sensors used in the pressure decay method are typically gauge pressure sensors having a reference to atmospheric pressure. When the gauge pressure sensor is used at normal test pressures, the pressure change resulting from the leak test is a very small portion of the total range on the sensor, since the gauge pressure sensor measures pressure difference between the part pressure and atmosphere. Consequently, the signal from the sensor is relatively small. In order to obtain a usable reading with this system, it is often necessary to extend the test time, particularly, if large parts having small leaks are involved. In some cases this may result in unacceptably long test times.

Another method uses a mass flow leak sensor rather than a gauge pressure sensor. In precision mass flow leak testing, a mass flow leak sensor couples the test part to a non-leaking reference volume usually having substantially the same volume as the test part. Then the reference volume and the test part are pressurized to the same pressure. Both the reference volume and the test part are sealed off from the pressure supply. If a leak is present in the test part, the mass flow leak sensor measures the flow and the equalization of pressure between the leaking test part and the sealed reference volume. The difference in pressure causes gas to flow from the reference volume to the test part at a rate proportionate to the leak rate.

An alternative method to leak detection measurement using a deferential pressure sensor encloses the test part in a sealed bell jar. Leakage from the test part increases the internal pressure in the internal space within the bell jar and exterior to the test part. The increase in pressure relative to a reference pressure is measured by a transducer and converted to an equivalent leakage rate.

This method, however, is less sensitive to the effects of high test pressures and is not sufficiently accurate to detect low leakage rate particularly when short test times are employed. This is because the internal free volume of a bell jar can be large. Because the differential pressure rate involves the measurement of pressure at two different times and the time interval is a function of transducer sensitivity, this method is often not adequate in critical applications. These measurements cannot be made until sufficient time has lapsed to develop a differential pressure.

U.S. Pat. No. 5,546,789, Leakage Detection System, assigned to the assignee of the present invention, employs a sealed test fixture or bell jar which surrounds the test part and is connected to a reference pressurized reservoir. A reference bias flow is introduced into the bell jar to establish a floor or offset where any deviation measured from the introduced bias flow indicates an anomaly (or leak). The test part is pressurized and the flow between the bell jar and the reference pressurized reservoir is measured by a mass flow leak sensor. The measured flow is used to determine the leakage of the test part by taking into account the previously introduced reference bias flow. This method provides accurate measurements of leaks having low flow rates occurring over short periods of time.

While the foregoing method provides accurate measurements of leaks using a mass flow technique, in some situations the mass flow technique may not be used. For example, accurate measurement of the seat leakage of hydraulic valves is a difficult to achieve. Seat leakage occurs at very small flow rates compared to the flow rate of fluid when the valve is opened. Detection systems suitable for accurate measurements in the range of typical leakage flows are usually not robust enough to withstand the full flow of fluid when the valve is open for purging, for example. Typically, the ratio of full flow to leakage flow is approximately 250:1 or greater.

For this reason, most hydraulic leakage detection systems utilize pressure, rather than mass flow, to measure leakage. A typical pressure measurement system employs a pressure source (which may be liquid or gas), which applies pressure to the valve under test, a test pressure sensor between the source and the valve under test, a second valve and a leakage pressure transducer between the two valves. Seat leakage is quantified by measuring the change in pressure in the pipe section between the two valves after the valve under test is closed. To measure leakage pressure, the two valves are closed. Pressure is then measured in the section for a period of time and is a function of the leakage from the valve under test.

This techniques has an important drawback. The relationship between the pressure increase and the leakage is a function of the compressibility of the test fluid in the pipe section between the valves. Fluid compressibility is often expressed as bulk modulus, E, of the test fluid and is the ratio of the change in pressure to the percent change in volume, $E=dP/(dV/V)$. Solving for $dP=E(dV/V)$.

Bulk modulus is not constant in most practical applications; it is nonlinear in most ranges. The bulk modulus for most fluids is a function of temperature, fluid pressure and fluid purity (many fluids are hygroscopic in that they absorb water from the air). Also, bulk modulus is dependent on the proportion of entrapped or entrained air in the fluid. Even if temperature, pressure and fluid purity can be controlled, eliminating air from the test fluid is almost impossible in test situations. Since new valves for test are repeatedly being introduced into the test system, there is sometimes insufficient time to purge the entrapped air between tests. Even if additional time is taken to purge the system between tests, some air in the system, such as air in fittings, pipe threads, dead end or blind passages, cannot be purged.

There is a need for a leakage detection system and method which is independent of the bulk modulus of the test fluid.

SUMMARY OF THE INVENTION

A method of, and apparatus for, determining leakage in a valve or the like which is not dependent on bulk modulus of the fluid is described. A valve under test is provided for measurement of leakage in a test apparatus. The test apparatus includes a pressure transducer which measures the change in pressure along a length of pipe (XY) from the valve under test to a downstream or purge valve for a period of time. The effect of bulk modulus of the test fluid is eliminated by placing the pressure transducer in pressure communication with a volume of gas. To measure leakage of a valve under test, the volume of gas in pressure communication with the pressure transducer is maintained at atmospheric pressure as long as the valve under test and the downstream valve is open. When the valve under test and the downstream valves are closed, the pressure is first measured. Then the pressure is measured after a predetermined period of time. The pressure difference is a measure of the leakage of the valve under test.

In an alternate embodiment, the pressure transducer is placed between two volumes of gas. The first volume of gas (the test volume) is placed between the test section and one side of the pressure transducer. A second or reference volume of gas is placed on the other side of the pressure transducer. A reference vent valve is provided between the pressure transducer and the second or reference volume of gas such that the reference volume is maintained at whatever atmospheric pressure is present when the reference valve is closed.

The air test volume, is constructed so that the leakage test fluid in a line section XY pressurizes the air in the air test volume much like an air over oil accumulator. The air volume inside the air test volume is approximately equal to the air volume in the reference volume. Both volumes are many times greater than the maximum possible air volume that may be present in a test fluid section XY.

The sequence of operation is generally as follows. During the initial phase, the valve under test is opened. For convenience, the pipe test section XY is located between the valve under test and a downstream or purge valve. The valve under test and the purge valve are opened. Full rated flow from the valve under test takes place for the section XY through the purge valve. The air test volume is held at atmospheric.

Next the test leak sequence is started. First, the valve under test is closed. Then the purge valve is closed. Pressure is measured at the pressure transducer. If a reference pressure volume is present, the pressure in the reference volume is fixed at the atmospheric pressure existing at the start of the leak test. After a predetermined period of time, pressure is measured at the pressure transducer. Pressure in the air test volume increases as a function of the leakage from the valve under test.

If air test volume is designated $V_t$, the relationship between the pressure increase in volume $V_t$ and the leakage is expressed as follows:

$P_{Vt}=P_{XY}$ $P_{Vt}V_t=MRT=\text{constant }(K)$ $dP_{Vt}=P_{Vtf}-P_{Vti}$ (final pressure−initial pressure)

$d_{Vt}=V_{tf}-V_{ti}$ (final air volume−initial air volume)

$P_{Vti}V_{ti}=P_{Vtf}V_{tf}$ $dP_{Vt}=-P_{Vti}dV_t/(V_{ti}+dV_t)$ $V_{XY}+V_t=\text{constant}$ $dV_{XY}=Lt$ (change in volume due to leakage)

$dV_t=-dV_{XY}$ (change in air volume)

This is where:

$P_{Vt}$=Pressure in air test volume, $P_{XY}$=Pressure in pipe segment XY, f=final condition, i=initial condition, M=Mass of air in the test reservoir, assumed to be a constant, R=Gas Law constant for air, T=Absolute temperature of air in the test, reservoir (assumed to be constant during testing), L=Leakage in cc/min, and t=Test time in minutes.

The differential pressure transducer has one side at atmosphere and the other slightly above atmosphere, resulting in an output signal proportional to the pressure differential representing leakage at the end of an interval, such as 30 seconds. The introduction of the reservoir $V_t$ with an air volume many times greater than any likely volume of air in a pipe segment XY during leak testing changes the detection principle from dependency on the characteristics of bulk modulus to dependency solely on Boyle's gas law. The resulting low liquid flow leak detection system is significantly more accurate and repeatable than prior systems utilizing test fluid compressibility.

The principle aspect of the present invention is to provide a highly accurate liquid leak testing apparatus and method.

It is another aspect of the present invention to provide a highly repeatable liquid leak testing apparatus and method.

Other aspects and advantages of this invention will become apparent to one of ordinary skill in the art upon a perusal of the following specification and claims in like of the accompanying drawings.

BRIEF DESCRIPTION OF THE DRAWINGS

FIG. 3 is a schematic of the electrical and pneumatic circuits of the test apparatus shown in FIG. 1;

FIGS. 4a–4b is a schematic of the hydraulic circuit of the test apparatus shown in FIG. 1;

DETAILED DESCRIPTION OF THE PREFERRED EMBODIMENTS

Figure 1:
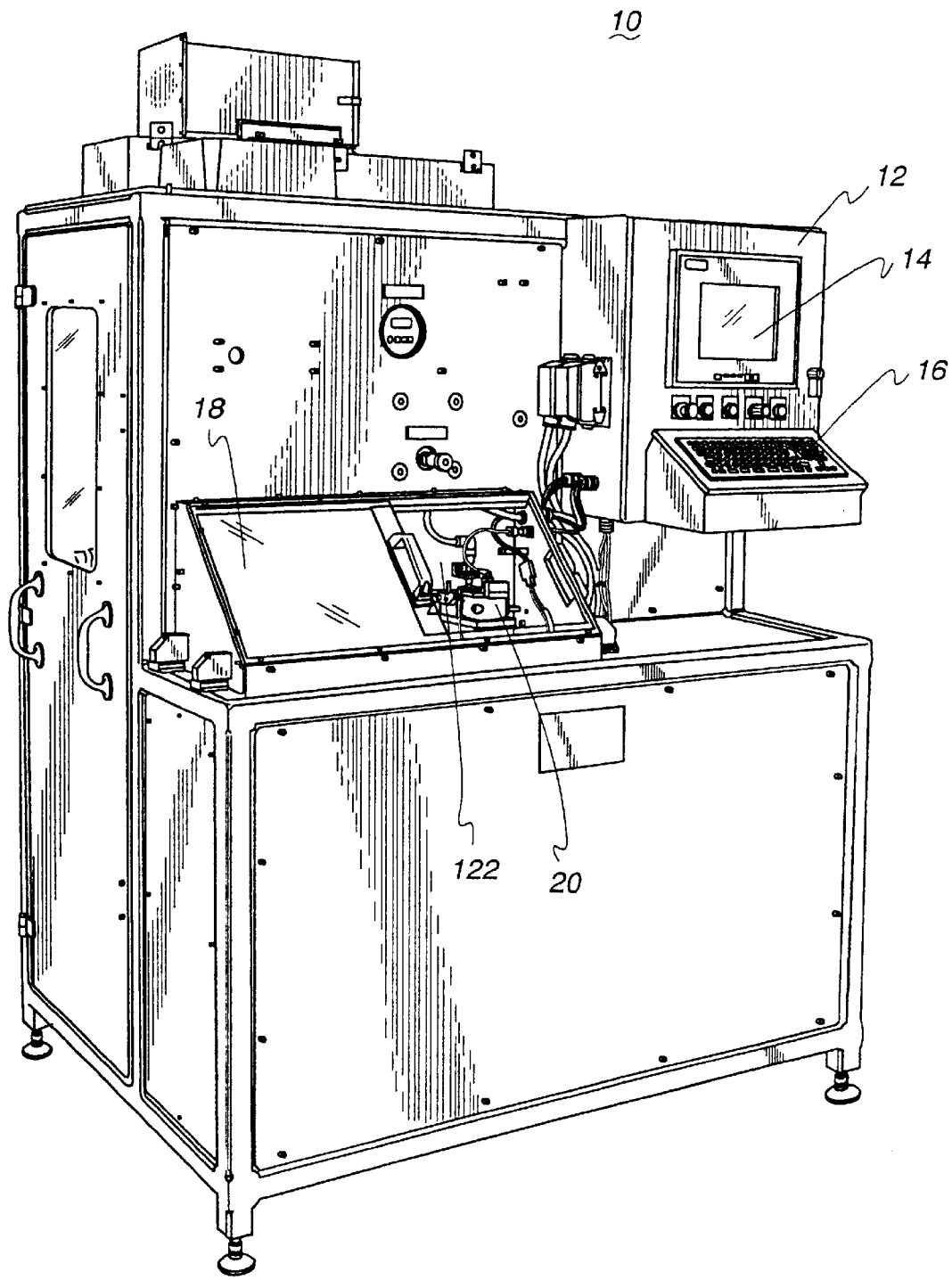
FIG. 1 is a perspective view of leak detection apparatus.

Referring now to the drawings, and especially to FIG. 1, a leak detection apparatus according to the invention is shown therein and indicated by reference numeral 10. Leak detection apparatus 10 includes a test connector or fixture 20 for receipt of a valve to be tested which is enclosed in a chamber 122. When a test is to be made, door 18 is closed and locked providing a sealing to chamber 122. This protects the operator in the event of a malfunction of the test device. Operation of the test apparatus is controlled by computer 12 which includes a keyboard 16 for receipt of user commands and a display 14 for displaying graphics and text messages and information.

Figure 2:
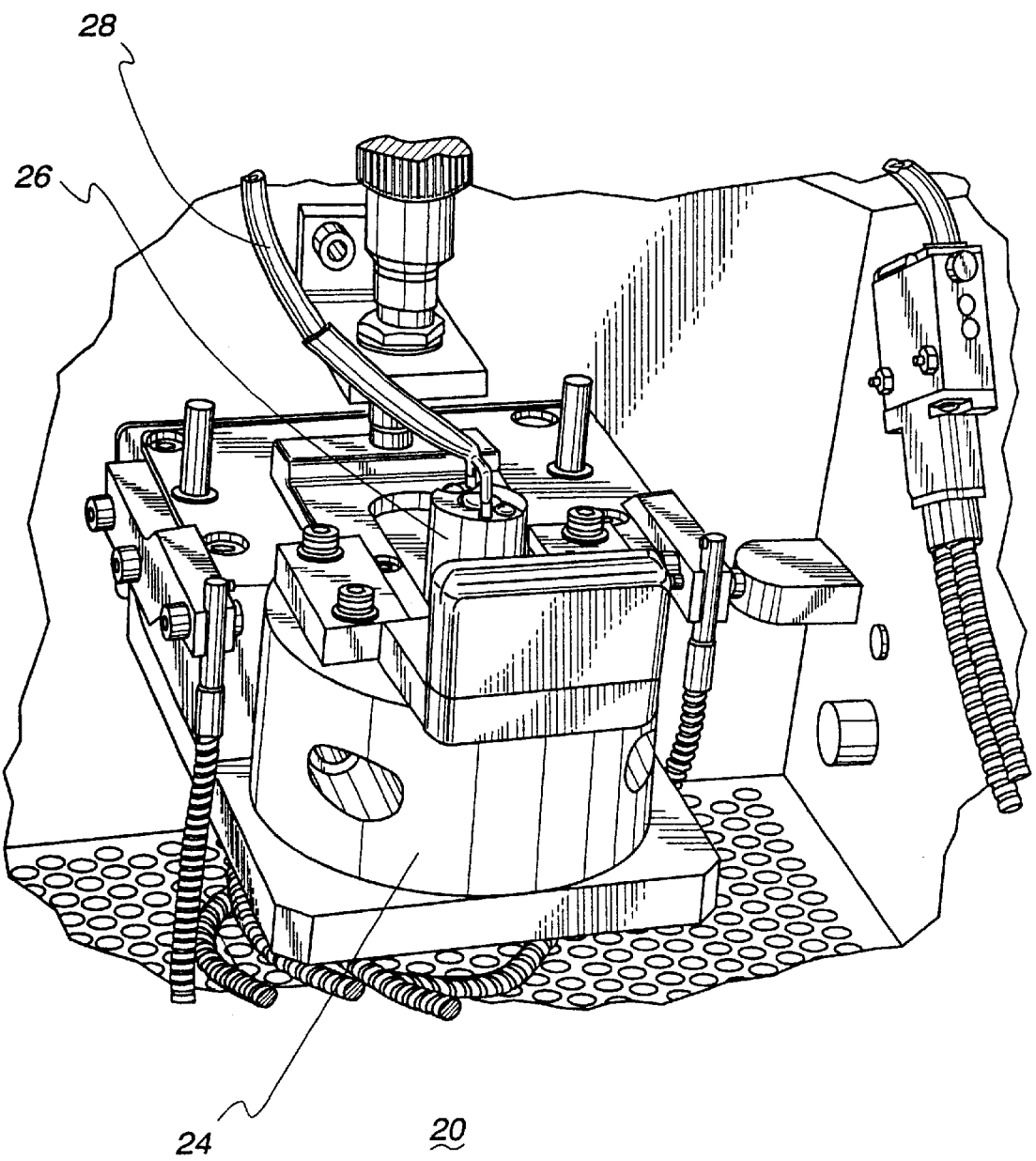
FIG. 2 is a perspective view of the test connector shown in FIG. 1.

Referring to FIG. 2, test connector or fixture 20 includes a housing or nest 24 for receiving the valve under test (not shown). Energizing coil 26 receives electric power from line 28 and opens and closes the valve under test within the housing.

Referring to FIG. 3, control of the apparatus for leakage detection 10 is accomplished through computer 12. Computer 12 includes standard user interface elements: touch screen interface and display 14, keyboard 16, hard disk 17, and floppy disk 19. Electrical signals M from leakage pressure sensor 220, L from pressure gauge 250, K from leak fluid temperature sensor 350, J from test fluid temperature sensor 338 and H from test pressure sensor 348 are input to multiplexer 90, which provides the analog signals to analog/digital converter card 92, which provide digital inputs to computer 12.

I/O module board 300 is couples control signals from computer 12 via digital I/O card 34 to the various control elements in apparatus 10. When part energizing coil relay 32 receives a signal from I/O board 300, power from coil power supply 31 is enabled energizing part energizing coil 26.

Start button 52 provides a start input to the computer via I/O board 300. I/O board 300 also provides control signals from computer 12 to door latch 94, signal G to fixture test valve 342, signal F to fixture unvent valve 346, signal E to pressure enable valve 340. I/O board 300 provides signals A, B, C, D to solenoid valves 62. Signal A enables air supply 64 to test valve 318. Signal B enables air supply 64 to verify vent valve 256. Signal C enables air supply 64 to verify enable valve 254. Signal D enables air supply 64 to test valve 316, reference valve 230 and purge valve 240.

Programmable logic controller (PLC) 48 receives signals from part position sensor 41, part clamped sensor 43, guard door closed sensor 45, guard door lock 50 and provides ready to test signal 54 to board 300. PLC 48 receives computer ready signal 56, test in progress signal 58 and test complete signal 60 from board 300. These signals are used in the test sequences (described below with reference to FIGS. 5, 6 and 7).

Test fluid is provided in a tank 200. Temperature of the tank fluid is detected by tank fluid sensor 302, which provides a tank temperature signal to temperature controller 84. Temperature controller 84 controls tank heater 310 and cooling water control 88 which are used to maintain temperature of the test fluid at a constant level during tests.

Fluid level of the test fluid in the tank is also monitored and maintained. Pump motor 66 pumps fluid from fluid tank 200 through the test lines. Pump control 68, responsive to inputs from motor start button 72, motor stop button 70, low level sensor 74, emergency stop button 76, low level sensor 80, and over temperature sensor 78, controls operation of pump motor 66.

Figure 4A:
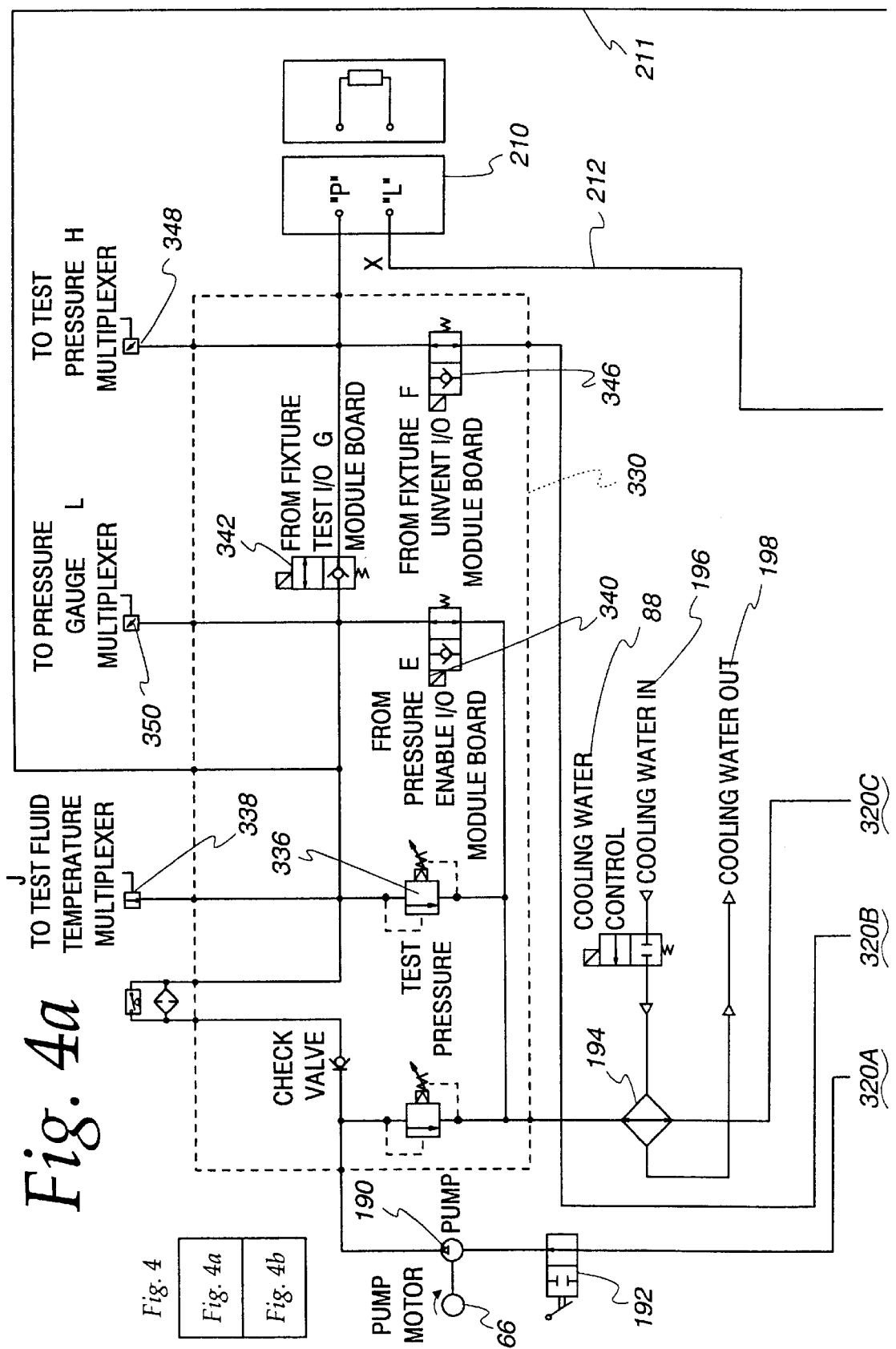

Referring to FIGS. 4a–4b, fluid is provided from fluid tank 200. The fluid used should be the type of fluid that will be flowing against the valve under test in its actual use. For example, the fluid may be hydraulic brake fluid when brake valves are being tested. To minimize the effects of bulk modulus changes due to temperature changes of the test fluid, several sensors and a heater are provided. Tank heater 310 maintains the fluid in the tank at a substantially constant temperature. Tank fluid temperature sensor 302 detects the fluid temperature and provides a temperature signal to temperature controller 84. Over temperature sensor 304 is a safety device which detects if the fluid temperature reaches a predetermined value. Over temperature sensor 304 provides its output to the temperature controller 84. Preferably, when this sensor detects the over temperature, the tank heater 310 is turned off. Two low level sensors 306, 308 detect the level of the fluid in the tank. Fluid may be drained or added to the tank from valve 312. Fluid is provided to the test system through output pipe or line 320A and fluid returns through return pipes or lines 320B, 320C.

Valve 192 is located in line 320A and is manually operable to provide isolation between the test circuit and the fluid tank 200. Pump motor 66 drives pump 190 which provides fluid from tank 200 via line 320A to the test circuit during test. Test pressure source 330 provides initial fluid pressure to valve under test 210. Cooling is provided to maintain temperature and pressure substantially constant and is provided by cooling water control 88 which controls cooling water in 196 and cooling water out 198 through device 194.

Test fluid temperature is taken at sensor 338 and provided as signal J to multiplexer 90. Pressure is enabled at valve 340 by signal E from I/O module board 300. Pressure gauge 350 detects pressure in the source and provides a signal L to multiplexer 90. Test pressure sensor 348 provides the test pressure signal H to multiplexer 90. I/O board 300 enables fixture test valve 342 via signal G, which when enabled provides the fluid pressure to valve under test 210. When testing is complete, I/O board 300 enables fixture unvent valve 346 via signal F.

The output of valve under test 210 is point X of the XY segment of pipe or line 212 through which test measurements are made. The XY line ends at point Y, which is prior to relief vent valve 230. A pressure transducer 220 is disposed between the valve under test 210 and relief valve 220. Two gas volumes, $V_r$ 218 and $V_t$ 216, provide the air over accumulator effect for eliminating the effect of bulk modulus of the fluid in line XY. The volume of air in 218 and 216 should be much larger than the anticipated volume of air in the fluid from leakage. Air at a volume of 20 cc, for example, may be used.

When valve under test is fully opened for full fluid flow, test pressure is maintained and verified by a series of valves which are controlled through I/O board 300. Valves 254 and 256, in conjunction with verify pressure valve 258, are used to maintain test pressure through line 211 and are controlled through signals C and B, respectively. Similarly, valve 252 is used to maintain test pressure in line 212.

Test enable valve 318 is located upstream of the pressure transducer 220 and is enabled by signal A from I/O board 300. Purge valve 240, reference valve 230 and test vent valve 316 are enabled by signal D from I/O board 300. Operation of the various valves during test measurement is described with respect to test sequence 500 below.

Figure 5A:
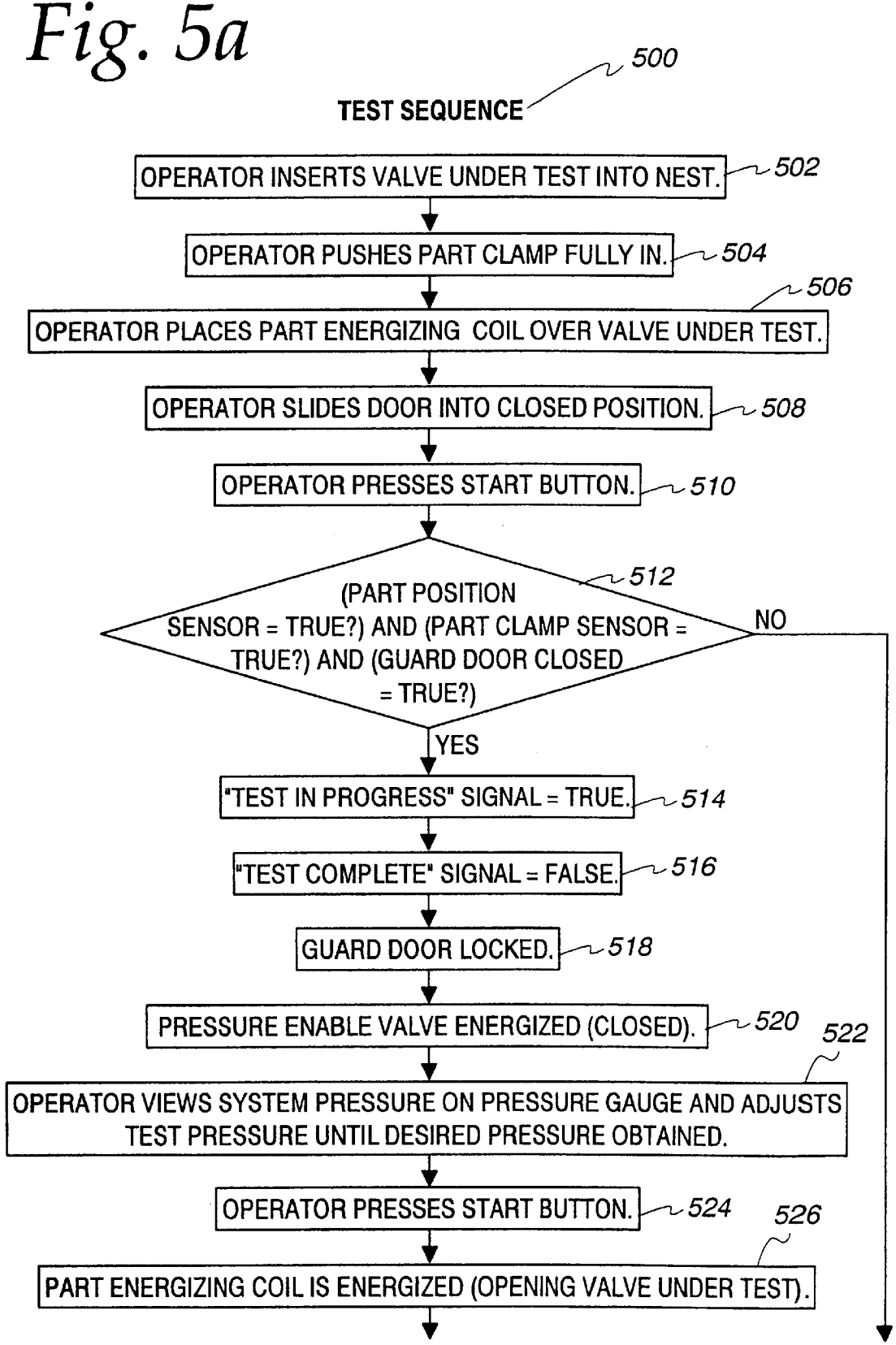
FIGS. 5a–5c is a flow chart of a test sequence for testing a valve.
Figure 5B:
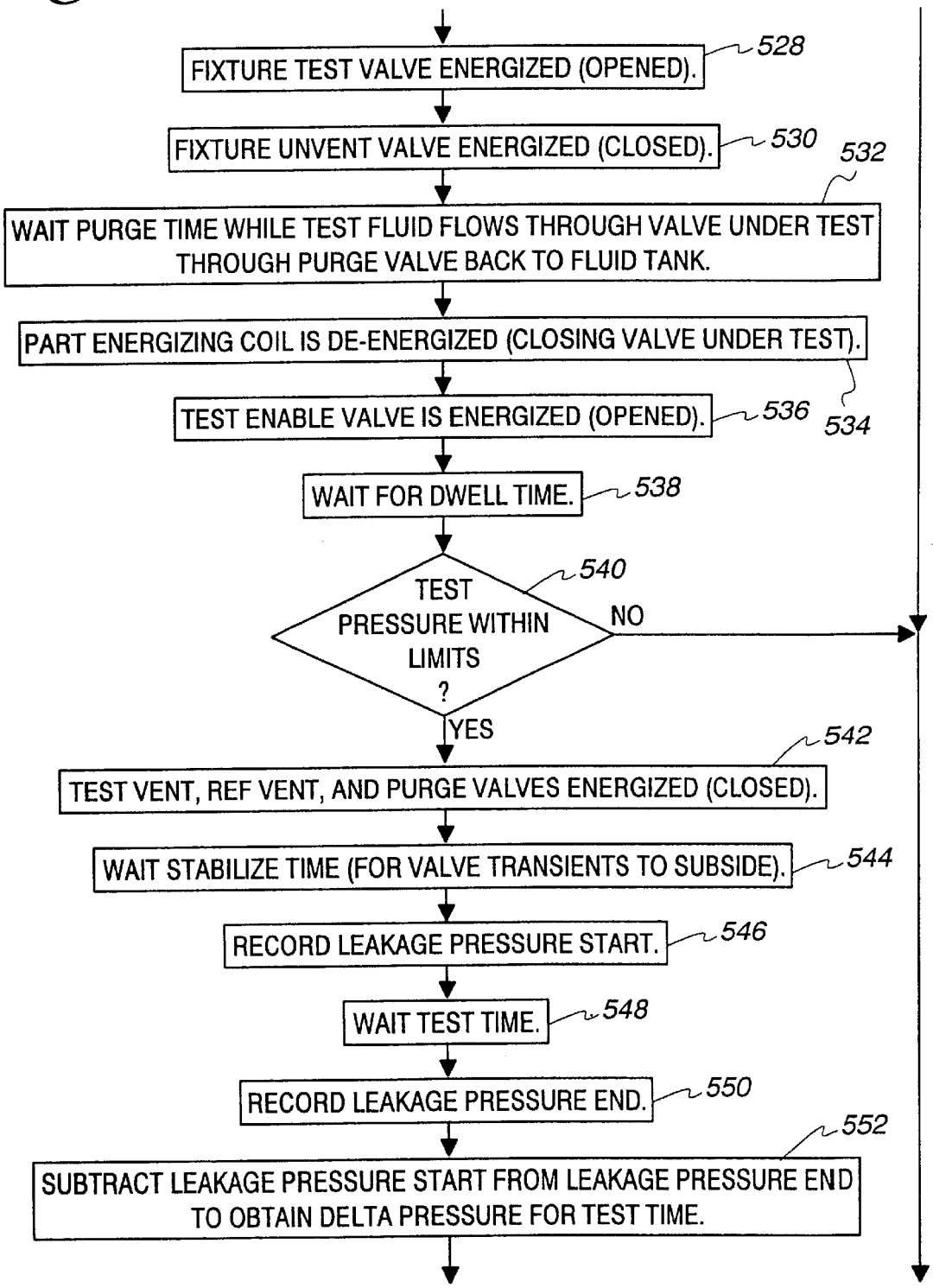
Figure 5C:
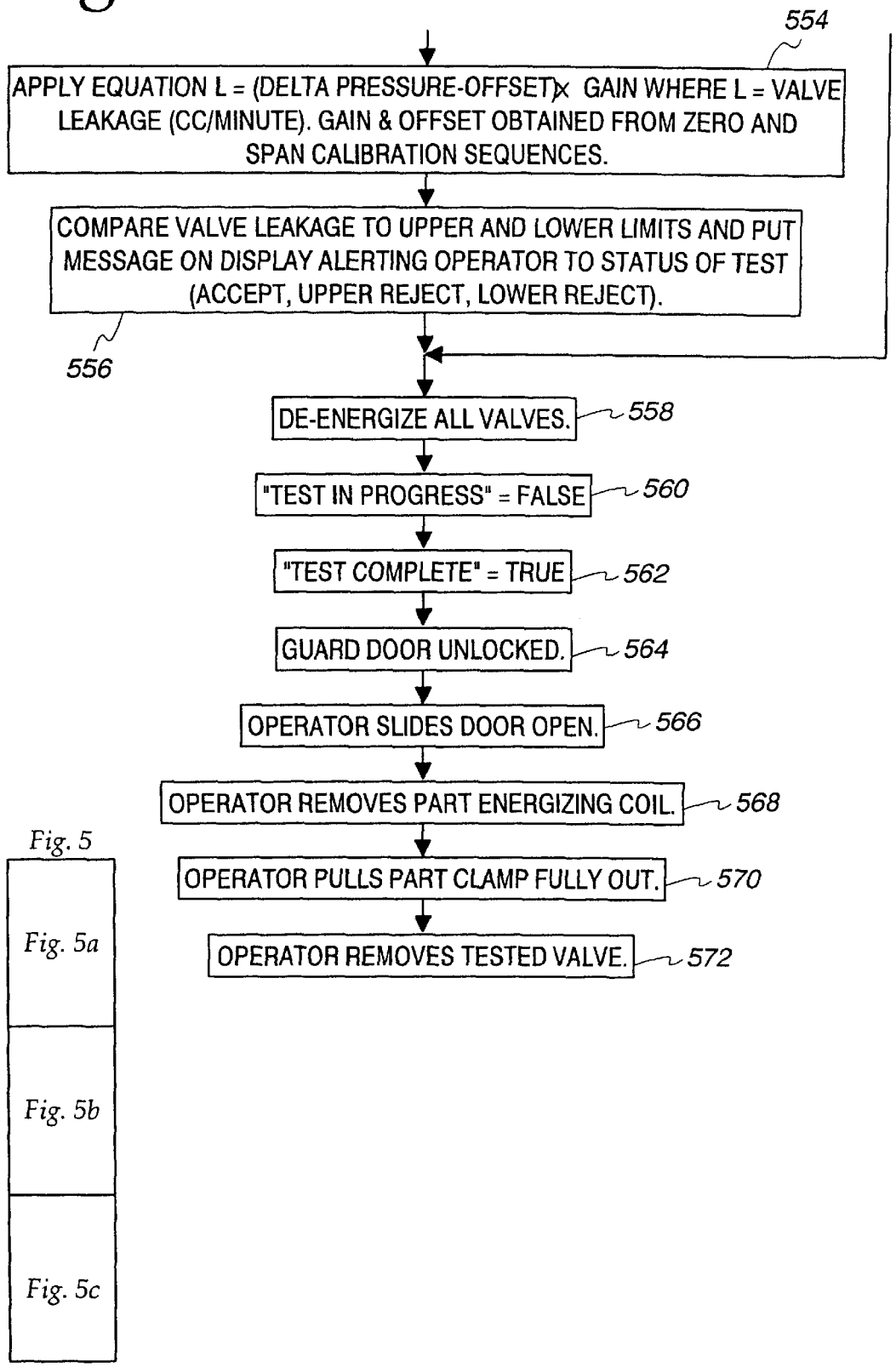

A test sequence 500 for detecting leaks in hydraulic valves is described with reference to FIGS. 5a–5c. To begin the test sequence 500, the operator inserts a valve to be tested 210 into nest 24 of test fixture 20 (step 502). The operator then pushes a part clamp fully in (step 504) to insure the valve is properly inserted into the fixture 20. Next the operator places the energizing coil 26 over the valve under test 210 (step 506). The operator must slide door 18 into a closed position (step 508) and presses the start button 52 (step 510).

In step 512, several tests are made before the computer 12 will allow the test to begin. The part position sensor 41 must indicate the valve under test is properly located, the part clamp sensor 43 must indicate the valve under test is properly held in place and the guard door closed sensor 45 must indicate the door is properly closed. If any of these conditions is not satisfied, the valve under test 210 is not ready to be tested and the routine branches to step 558.

If all conditions are satisfied, a "test in progress" message 58 is displayed on the display 14 (step 514). In step 516, the "test complete" signal 60 is set as false. In step 518, the guard door 18 is locked. In step 520 the pressure enable valve in energized (closed). In step 522, the operator views the system pressure on a pressure gauge and adjusts the pressure until the desired test pressure is obtained. Once the desired pressure is obtained, the operator presses the start button again (step 524).

At this point, the part energizing coil 26 is energized, opening the valve under test (step 526). Next the fixture downstream valve is opened (step 528) and the fixture unvent valve is closed (step 530). The operator waits for the system to purge itself; test fluid flows through the valve under test 210, down the XY pipe 212, through the downstream valve and back to the fluid tank (step 532). After the end of the purge time, the part energizing coil is de-energized closing the valve under test 210 (step 534) and the test enable valve 246 is energized (opened) (step 536). The system waits for the dwell time in step 538. If the test pressure is not within limits (step 540), the routine branches to step 558.

If test pressure is within limits, the test vent valve 244, reference vent valve 230 and purge valve 240 are energized (closed) (step 542). The system waits a period of time for the system to stabilize and valve transients to subside (step 544). Then the system starts the leakage pressure test recording in step 546, waits a test time in step 548 and records the leakage pressure in step 550.

In step 552, leakage pressure start is subtracted from leakage pressure end to obtain a delta pressure ($\Delta P$) for the test time. In step 554 valve leakage L in cubic centimeters per minute (cc/min) is calculated, where L=($\Delta P$−offset )gain. Gain and offset are determined from the Zero Calibration sequence 600 and Span Calibration sequence 700, respectively. Next the routine compares valve leakage L to the upper and lower limits defined for the particular valve and displays a message on display 14 advising the operator of the results and status of the test (step 556). In most cases, the routine will display qualitative results: Accept, Upper reject, Lower reject, rather than quantitative results.

In step 558, all valves are de-energized. The "test in progress" signal is set false (step 560), the "test complete" signal is true (step 562) and the guard door 18 is unlocked (step 564). The operator then opens the guard door 18, removes the part energizing coil 22 (step 568), pulls the part clamp out (step 570) and removes the valve under test (step 572). If step 558 were reached as a result of a failure of any of the preceding tests, the operator would reinstall the valve or other item requiring attention and restart the test sequence 500.

Figure 6A:
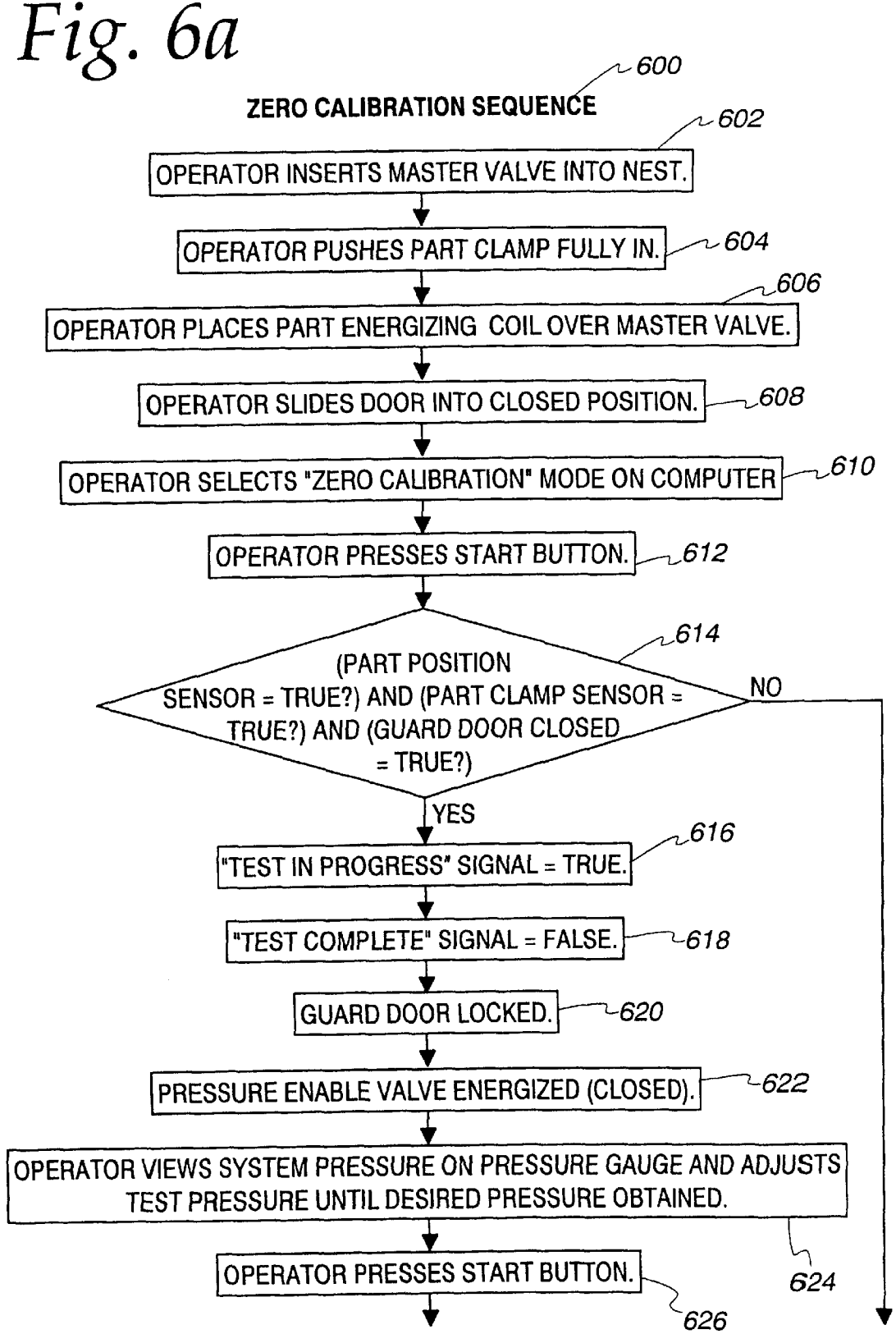
FIGS. 6a–6c is a flow chart of a zero calibration sequence.
Figure 6B:
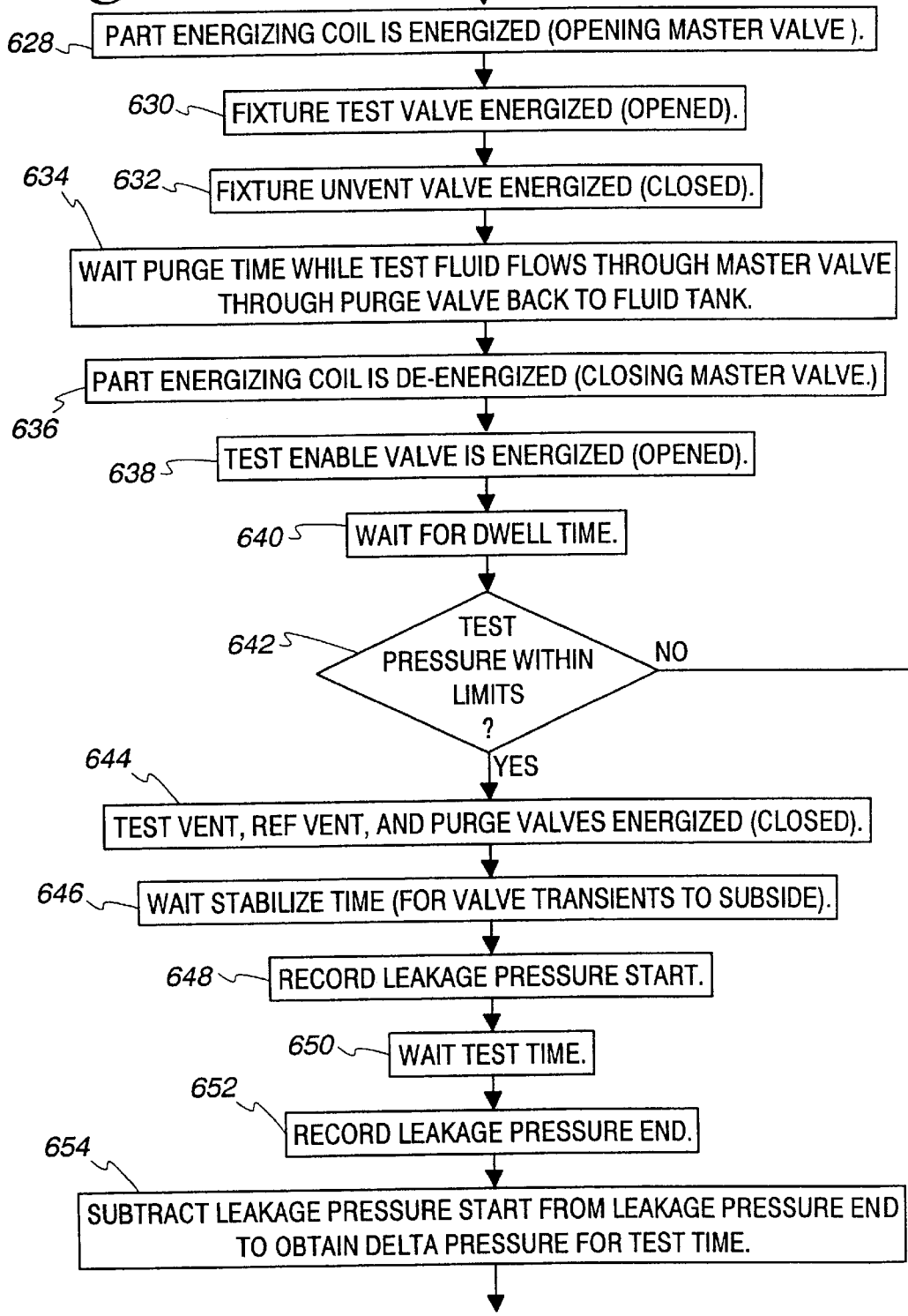
Figure 6C:
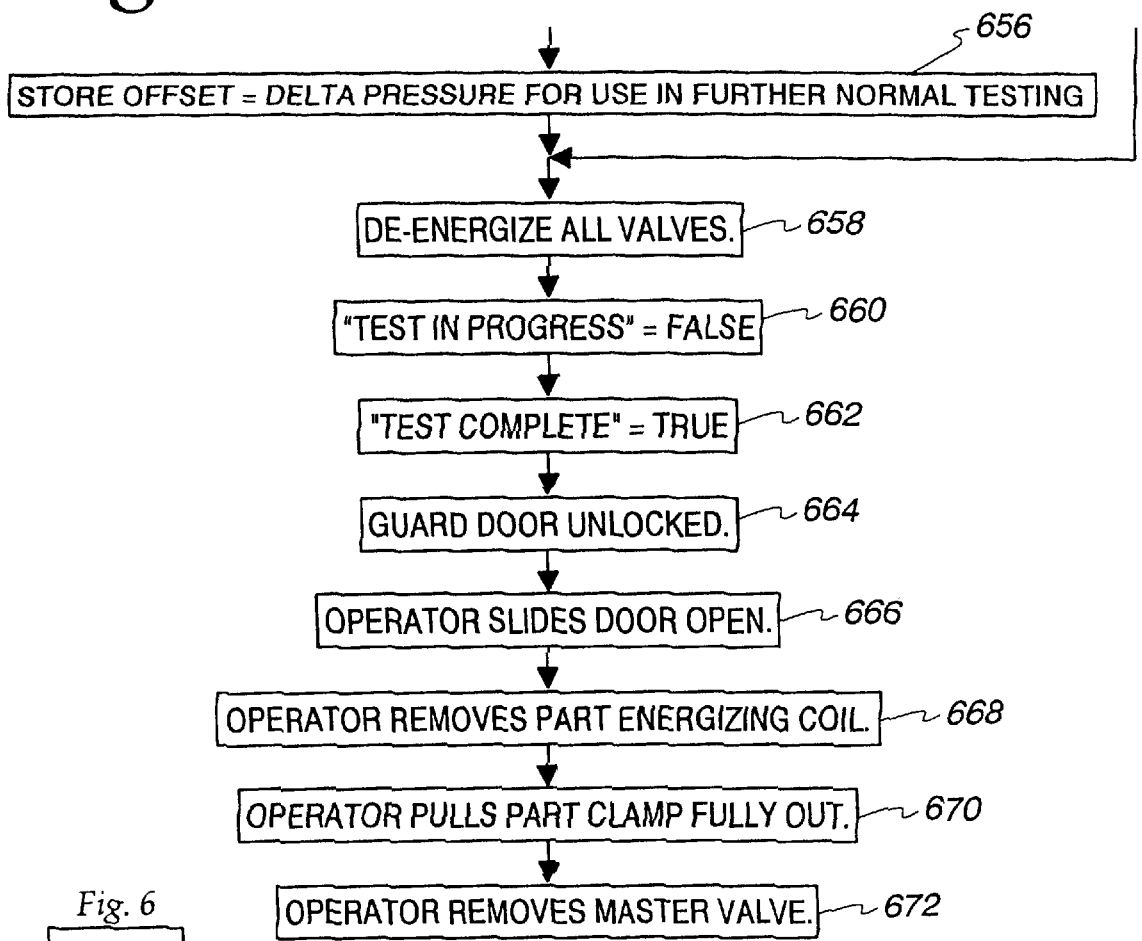

Offset is calculated in the zero calibration sequence 600. Referring to FIGS. 6a–6c, to begin the zero calibration sequence 600, the operator inserts a master valve into nest 24 of test fixture 20 (step 602). The operator then pushes the part clamp fully in (step 604) to insure the valve is properly inserted into the fixture 20. Next the operator places the energizing coil 22 over the master valve (step 606). The operator must slide door 18 into a closed position (step 608). The operator then selects "zero calibration" mode on computer 12 (step 610) and presses the start button (step 612).

In step 614, several tests are made before the computer 12 will allow the test to begin. The part position sensor must indicate the master valve is properly located, the part clamp sensor must indicate the master valve is properly held in place and the guard door closed sensor must indicate the door is properly closed. If any of these conditions is not satisfied, the master valve is not ready to be tested and the routine branches to step 658.

If all conditions are satisfied, a "test in progress" message is displayed on the display 14 (step 616). In step 618, the "test complete" signal is set as false. In step 620, the guard door 18 is locked. In step 622 the pressure enable valve in energized (closed). In step 624, the operator views the system pressure on a pressure gauge and adjusts the pressure until the desired test pressure is obtained. Once the desired pressure is obtained, the operator presses the start button again (step 626).

At this point, the part energizing coil is energized, opening the master valve (step 628). Next the fixture test valve is opened (step 630) and the fixture unvent valve is closed (step 632). The operator waits for the system to purge itself;

test fluid flows through the master valve, down the XY pipe 212, through the purge or downstream valve 240 and back to the fluid tank (step 634). After the end of the purge time, the part energizing coil is de-energized closing the master valve (step 636) and the test enable valve 246 is energized (opened) (step 638). The system waits for the dwell time in step 640. If the test pressure is not within limits (step 642), the routine branches to step 658.

If test pressure is within limits, the test vent valve 244, reference vent valve 230 and purge valve 240 are energized (closed) (step 644). The system waits a period of time for the system to stabilize and valve transients to subside (step 646). Then the system starts the leakage pressure test recording in step 648, waits a test time in step 650 and records the leakage pressure in step 652.

In step 654, leakage pressure start is subtracted from leakage pressure end to obtain a delta pressure (ΔP) for the test time. In step 656 the measured ΔP is the offset and stored in memory for use during test sequence 500.

In step 658, all valves are de-energized. The "test in progress" signal is set false (step 660), the "test complete" signal is true (step 662) and the guard door 18 is unlocked (step 664). The operator then opens the guard door 18, removes the part energizing coil 22 (step 668), pulls the part clamp out (step 670) and removes the valve under test (step 672). If step 658 were reached as a result of a failure of any of the preceding tests, the operator would reinstall the master valve or other item requiring attention and restart the zero calibration sequence 600.

Figure 7A:
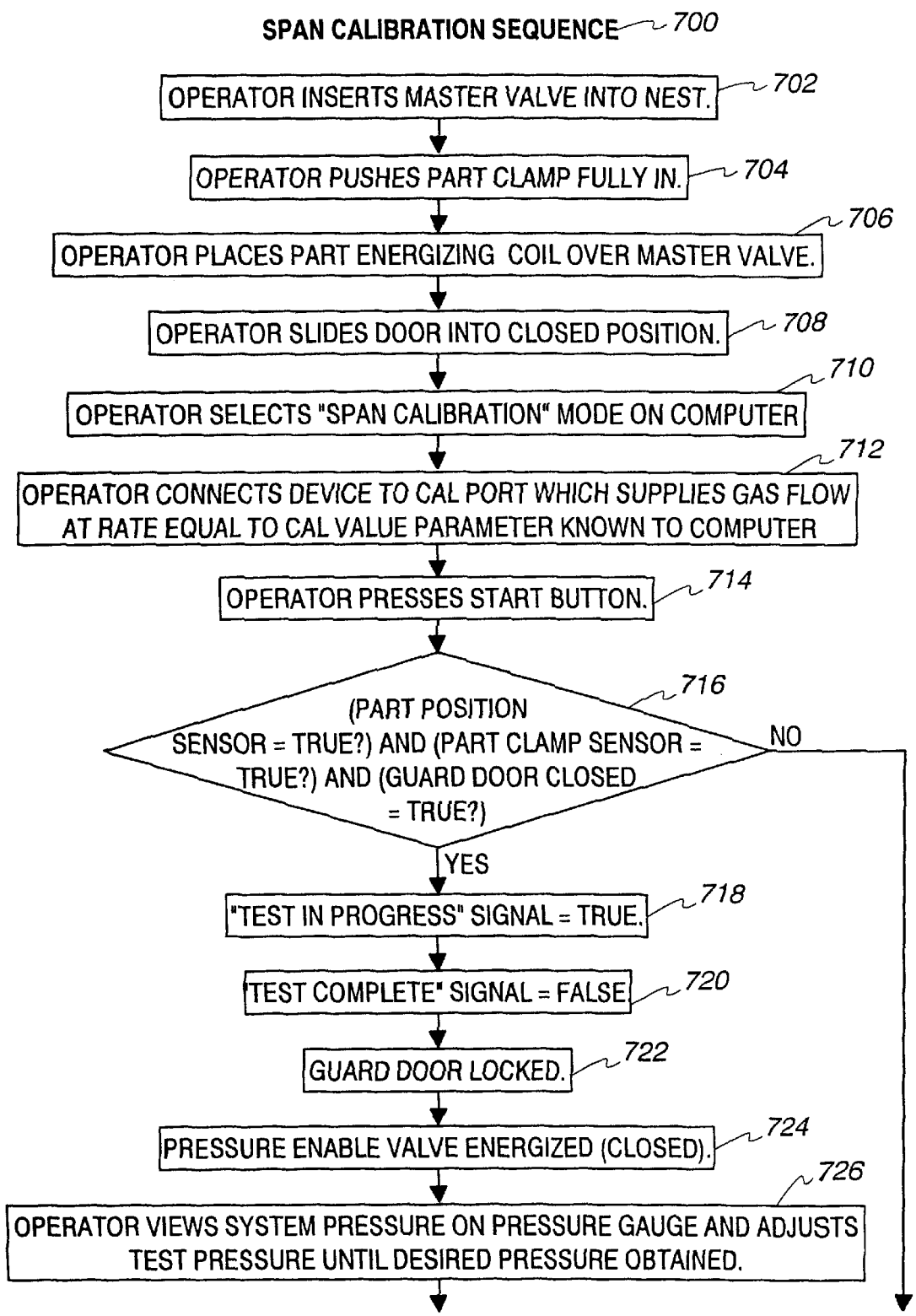
FIGS. 7a–7c is a flow chart of a span calibration sequence.
Figure 7B:
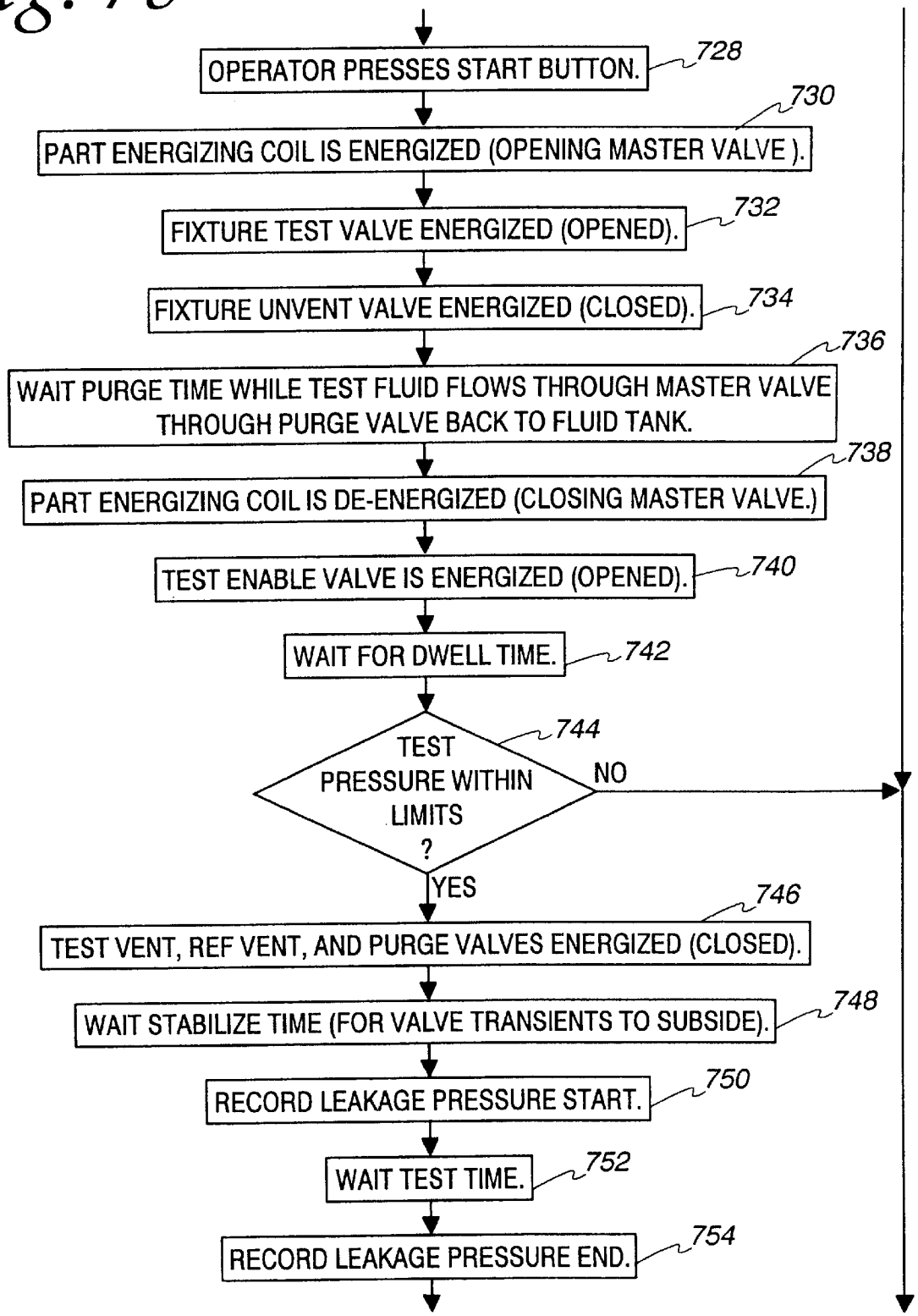
Figure 7C:
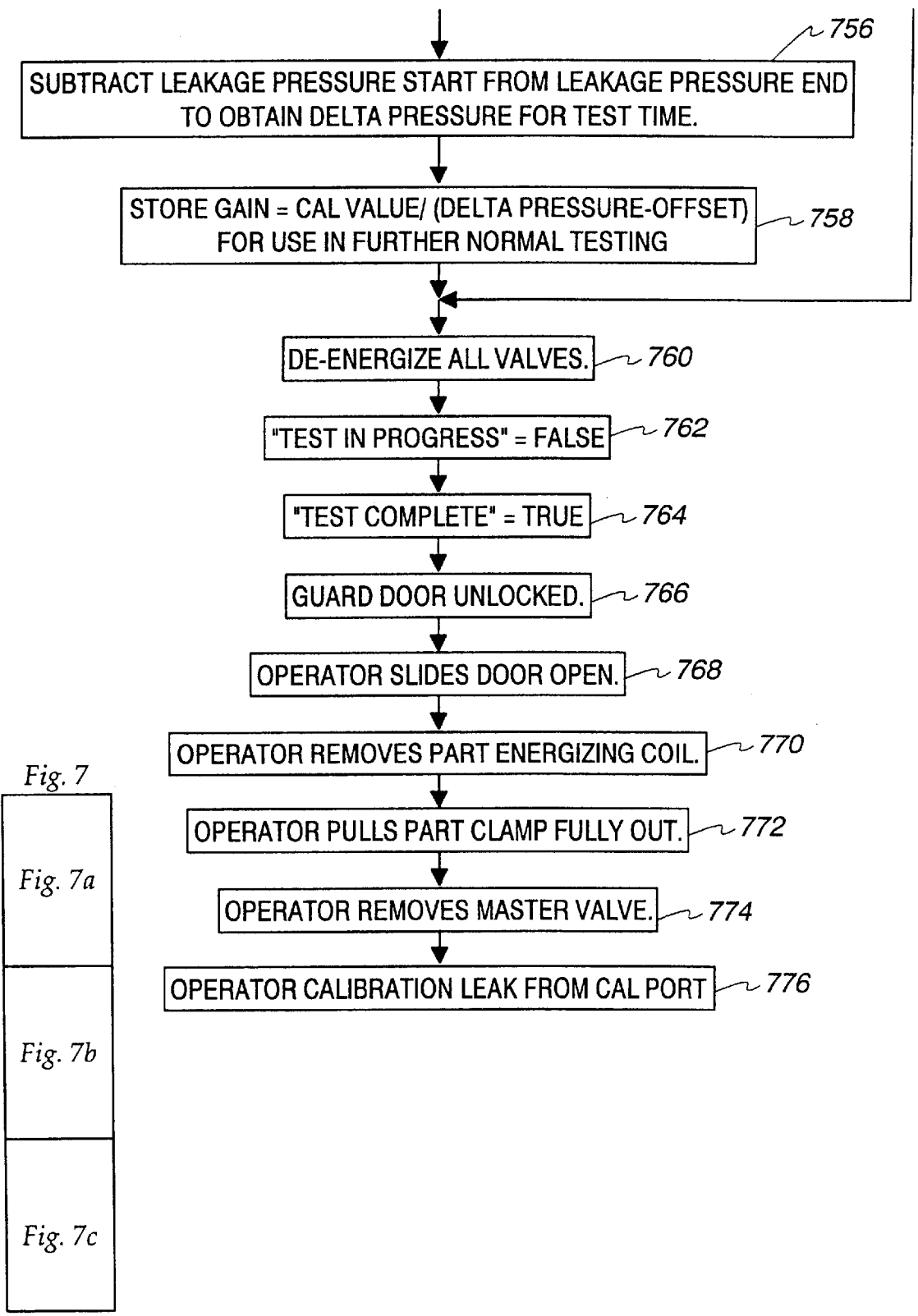

Gain is calculated in the span calibration sequence 700 shown in FIGS. 7a–7c. To begin the span calibration sequence 700, the operator inserts a master valve into nest 24 of test fixture 20 (step 702). The operator then pushes a part clamp fully in (step 704) to insure the valve is properly inserted into the fixture 20. Next the operator places the energizing coil 22 over the master valve (step 706). The operator must slide door 18 into a closed position (step 708), selects the "span calibration" mode on computer 12 (step 710), connects a device which supplies gas flow at a rate equal to the calibrated (cal) value stored in the routine to a calibration port (step 712) and presses the start button (step 714).

In step 716, several tests are made before the computer will allow the test to begin. The part position sensor must indicate the master valve is properly located, the part clamp sensor must indicate the master valve is properly held in place and the guard door closed sensor must indicate the door is properly closed. If any of these conditions is not satisfied, the master valve is not ready to be tested and the routine branches to step 760.

If all conditions are satisfied, a "test in progress" message is displayed on the display 14 (step 718). In step 720, the "test complete" signal is set as false. In step 722, the guard door 18 is locked. In step 724 the pressure enable valve in energized (closed). In step 726, the operator views the system pressure on a pressure gauge and adjusts the pressure until the desired test pressure is obtained. Once the desired pressure is obtained, the operator presses the start button again (step 728).

At this point, the part energizing coil is energized, opening the master valve (step 730). Next the fixture test valve is opened (step 732) and the fixture unvent valve is closed (step 724). The operator waits for the system to purge itself; test fluid flows through the master valve, down the XY pipe 212, through the downstream valve and back to the fluid tank (step 736). After the end of the purge time, the part energizing coil is de-energized closing the master valve (step 738) and the test enable valve 246 is energized (opened) (step 740). The system waits for the dwell time in step 742. If the test pressure is not within limits (step 744), the routine branches to step 760.

If test pressure is within limits, the test vent valve 244, reference vent valve 230 and purge valve 240 are energized (closed) (step 746). The system waits a period of time for the system to stabilize and valve transients to subside (step 748). Then the system starts the leakage pressure test recording in step 750, waits a test time in step 752 and records the leakage pressure in step 754.

In step 756, leakage pressure start is subtracted from leakage pressure end to obtain a delta pressure (ΔP) for the test time. In step 758 gain=cal value/(ΔP−offset) is calculated and stored for use in test sequence 500.

In step 760, all valves are de-energized. The "test in progress" signal is set false (step 762), the "test complete" signal is true (step 764) and the guard door 18 is unlocked (step 766). The operator then opens the guard door 18 (step 768), removes the part energizing coil 22 (step 770), pulls the part clamp out (step 772) and removes the valve under test (step 774). In step 776 the operator removes the device from the cal port. If step 760 were reached as a result of a failure of any of the preceding tests, the operator would reinstall the master valve or other item requiring attention and restart the span calibration sequence 700.

EXAMPLE

Test results using the leakage detection apparatus 10 produced the following results.

$P_{Vti}=14.7$ psia, $V_t=20$ cc, $L=0.05$ c/min, $t=0.5$ minutes $dV_{XY}=0.05 \times 0.5=0.025$ cc $dV_t=-dV_{XY}=-0.025$ cc $dP_{Vt}=-P_{Vti}dV_t/(V_{ti}+dV_t)=(-14.7 \times (-0.025))/(20+(-0.025))=0.0184$ psia $P_{Vtf}=0.0184+14.7=14.7184$ psia.

The differential pressure transducer has one side at atmosphere (assumed to be 14.7 psia) and the other at 14.7184 psia resulting in an output signal proportional to 0.0184 psia representing the leakage at the end of a 30 second test interval.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method of detecting a leak in a device under test, comprising:

placing the device under test in a fluid flow path;

providing a pressure transducer downstream in the fluid flow path from the device under test;

providing a volume of gas in pressure communication with the pressure transducer; detecting a first pressure at the pressure transducer when the device under test is closed to prevent fluid flow;

detecting a second pressure at the pressure transducer a predetermined period of time thereafter; and wherein the difference between the first and the second detected pressures is a measure of the leakage of the device under test; and further comprising providing a second volume of gas downstream from the pressure transducer.

2. The method of claim 1, further comprising the step of establishing the pressure in the first-mentioned air volume at approximately atmospheric pressure prior to detecting the first pressure.

3. The method of claim 2, further comprising the step of maintaining the pressure in the second air volume at approximately the pressure at time of closure of the device under test.

4. The method of claim 1, further comprising the step of providing a second device downstream from the second air volume.

5. The method of claim 1, further comprising the step of maintaining the temperature of the fluid substantially constant.

6. The method of claim 1, further comprising:

providing an offset and a gain;

calculating the leakage, L, of the device under test, wherein $L=(\Delta P-\text{offset})\times\text{gain}$, where $\Delta P$ is the difference between the first and second detected pressures; and wherein the offset is determined by:

placing a master device in a fluid flow path;

providing a pressure transducer downstream in the fluid flow path from the device under test;

providing a first volume of gas in pressure communication with the pressure transducer;

detecting a first pressure at the pressure transducer when the device under test is closed to prevent fluid flow;

detecting a second pressure at the pressure transducer a predetermined period of time thereafter; and wherein the difference between the first and second detected pressures is the offset; and wherein the gain is determined by:

placing a master device in a fluid flow path; providing a fluid flow at a predetermined rate;

providing a pressure transducer downstream in the fluid flow path from the device under test;

providing a first volume of gas in pressure communication with the pressure transducer;

detecting a first pressure at the pressure transducer when the device under test is closed to prevent fluid flow;

detecting a second pressure at the pressure transducer a predetermined period of time thereafter;

wherein the gain is the ratio of the predetermined value to the difference between the first and second detected pressures less the offset.

7. Apparatus for detecting a leak in a device under test, comprising: a housing for supporting the device under test in a fluid flow path;

a pressure transducer located downstream from the device under test in the fluid flow path;

a volume of gas in pressure communication with the pressure transducer;

a controller for detecting a first pressure at the pressure transducer when the device under test is closed to prevent fluid flow and for detecting a second pressure at the pressure transducer a predetermined period of time thereafter; and wherein the difference between the first and second detected pressures is a measure of the leakage of the device under test; and further comprising a second volume of gas located downstream from the pressure transducer.

8. The apparatus of claim 7, further comprising a second device located downstream from the second air volume.

9. The apparatus of claim 8, further comprising a fluid source maintained at a substantially constant temperature.

* * * * *